United States Patent
Scavo et al.

(10) Patent No.: US 10,474,715 B2
(45) Date of Patent: Nov. 12, 2019

(54) ELECTRONIC MEDIA SIGNATURE BASED APPLICATIONS

(71) Applicant: Free Stream Media Corp., San Francisco, CA (US)

(72) Inventors: Damian Scavo, Palo Alto, CA (US); Loris D'Acunto, Padua (IT); Manuel Gilioli, Padua (IT)

(73) Assignee: Free Stream Media Corp., San Francisco, CA (US)

( * ) Notice: Subject to any disclaimer, the term of this patent is extended or adjusted under 35 U.S.C. 154(b) by 0 days.

(21) Appl. No.: 15/354,848

(22) Filed: Nov. 17, 2016

(65) Prior Publication Data

US 2017/0068731 A1    Mar. 9, 2017

Related U.S. Application Data

(63) Continuation of application No. 13/843,728, filed on Mar. 15, 2013, now abandoned.

(60) Provisional application No. 61/645,338, filed on May 10, 2012, provisional application No. 61/643,090, filed on May 4, 2012.

(51) Int. Cl.
| G06F 16/683 | (2019.01) |
| G06F 16/48 | (2019.01) |
| G06F 7/02 | (2006.01) |

(52) U.S. Cl.
CPC ............ *G06F 16/683* (2019.01); *G06F 7/026* (2013.01); *G06F 16/48* (2019.01)

(58) Field of Classification Search
USPC .......................................................... 707/748
See application file for complete search history.

(56) References Cited

U.S. PATENT DOCUMENTS

| 8,639,706 B1* | 1/2014 | Bilinski | G06F 17/30749 707/752 |
| 2006/0265427 A1* | 11/2006 | Cohen et al. | G06F 17/30038 707/999.2 |
| 2008/0173717 A1* | 7/2008 | Antebi | G01S 5/22 235/439 |
| 2011/0060738 A1* | 3/2011 | Gates | G06F 17/30749 707/737 |
| 2012/0188345 A1* | 7/2012 | Salow | H04N 21/2743 348/47 |
| 2012/0317240 A1* | 12/2012 | Wang | H04H 60/37 709/219 |

* cited by examiner

*Primary Examiner* — Muluemebet Gurmu
(74) *Attorney, Agent, or Firm* — Procopio, Cory, Hargreaves & Savitch LLP

(57) ABSTRACT

A method for processing media data includes receiving metadata associated with media data; identifying another metadata associated with another media data, wherein the size of the media data is smaller than the size if the another media data; determining a score based on the metadata and another metadata, wherein the score is within a threshold level; and presenting information associated with a product or service associated with the another media data.

19 Claims, 13 Drawing Sheets

ELECTRONIC MEDIA SIGNATURE BASED APPLICATIONS

This application is a continuation application from U.S. application Ser. No. 13/843,728, filed Mar. 15, 2013, which claims priority to U.S. provisional applications 61/643,090 filed on May 4, 2012, and 61/645,338 filed on May 10, 2012, the disclosures of which provisional applications are incorporated herein in their entireties by reference.

FIELD

The subject matter discussed herein relates generally to data processing and, more particularly, to electronic media signature based applications.

BACKGROUND

Some segments of music or songs sound similar to one another, and some segments of video may be hard to distinguish from one another. Sometimes it may be difficult to identify a song even after hearing the entire song. Other times there may be a need to identify a song or a video quickly (i.e., without hearing or viewing the entire media).

For example, a person may hear only a segment of a song played on a radio. Then, without the time or opportunity to hear the entire song, that person may decide to purchase the song and, thus, needs to identify it. As another example, a person may happen to see the tail end of a television commercial and would like to identify and purchase the product being advertised, but may not have the opportunity or wish to wait for a rebroadcast of the commercial.

A solution is needed.

DETAILED DESCRIPTION

The subject matter described herein is taught by way of example embodiments. Various details have been omitted for the sake of clarity and to avoid obscuring the subject matter. Examples shown below are directed to structures and functions for implementing the present inventive concept.

Overview

Figure 1:
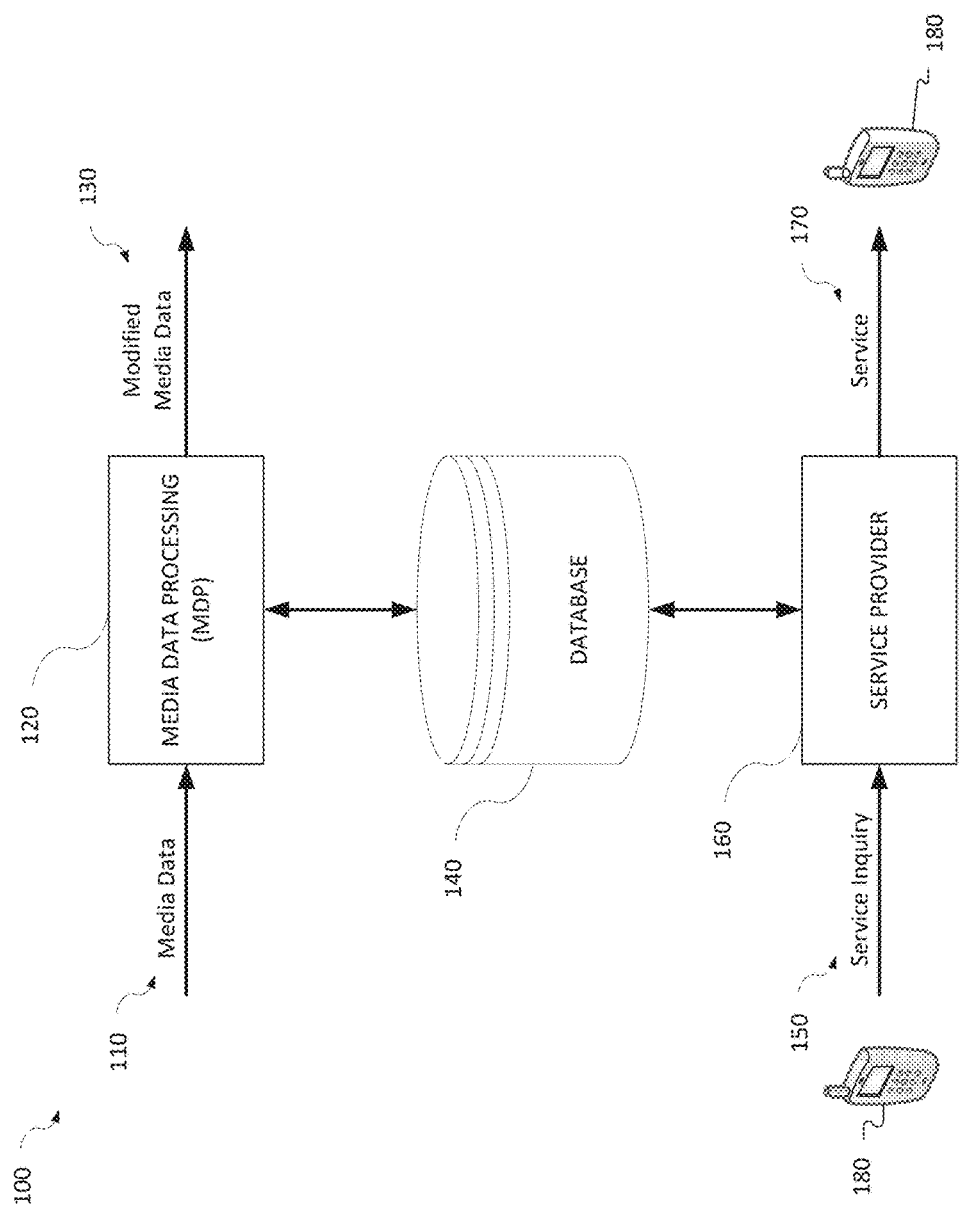
FIG. 1 illustrates an example environment where media data are processed and used in applications.

FIG. 1 illustrates an example environment where media data may be processed and used in one or more applications. Environment 100 illustrates that media data 110 may be input to media data processing (MDP) 120 for processing. The MDP 120 may communicate with a database 140 for storage needs, for example, but not limited to, storing and/or retrieving temporary, intermediate, and/or post-process data. The MDP 120 may provide modified media data 130 as output.

The MDP 120 may process the media data 110, and store or caused to be stored one or more forms of the media data 110, for example, modified media data 130, in the database 140 for use in one or more applications provided by a service provider 160. The service provider 160 may receive a service inquiry 150 and provide a service 170 using data (e.g., processed or modified media data) stored and/or retrieved in the database 140. The service inquiry 150 may be sent by, for example, a device 180. The service 170 may be provided to the device 180.

The media data 110 may be, for example, but not limited to, audio data and/or video data, or any data that includes audio and/or video data, or the like. The media data 110 may be provided in any form. For example, media data may be in a digital form. Audio and/or video (AV) data may be analog data or digital data. Media data may be provided, for example, by streaming or uploading to the MDP 120, retrieved by or downloaded by the MDP 120, or input to the MDP 120 in any other manner as would be understood by one skilled in the art. As one example, the media data 110 may be audio data uploaded to the MDP 120.

The MDP 120 processes the media data 110 to enable identification of the media data 110 using a portion or segment, for example, a few seconds of a song, of the media data 110. In some example embodiments, the media data 110 may be processed or modified. The processed or modified media data 130 may be provided (e.g., to the potential customer), stored in the database 140, or both.

The media data 110 and/or modified media data 130 may be associated with other information and/or content for providing various services. As one example, the media data 110 may be a media file such as a song. The media data 110 and/or modified media data 130 may be associated with information relating to the song, for example, but not limited to, singer, writer, composer, genre, release time, where the song can be purchased or downloaded, etc.

When a user hears the song being played, streamed, or broadcast, the user may record, for example with a mobile device or a smartphone, a few seconds of the song and upload the recording as servicer inquiry 150 to the service provider 160. The user may be provided as the service 170 information about the song and the purchase opportunity (e.g., a discount coupon) and a location from which to purchase or download the song.

Example Processes for Signing or Fingerprinting Media

Figure 2:
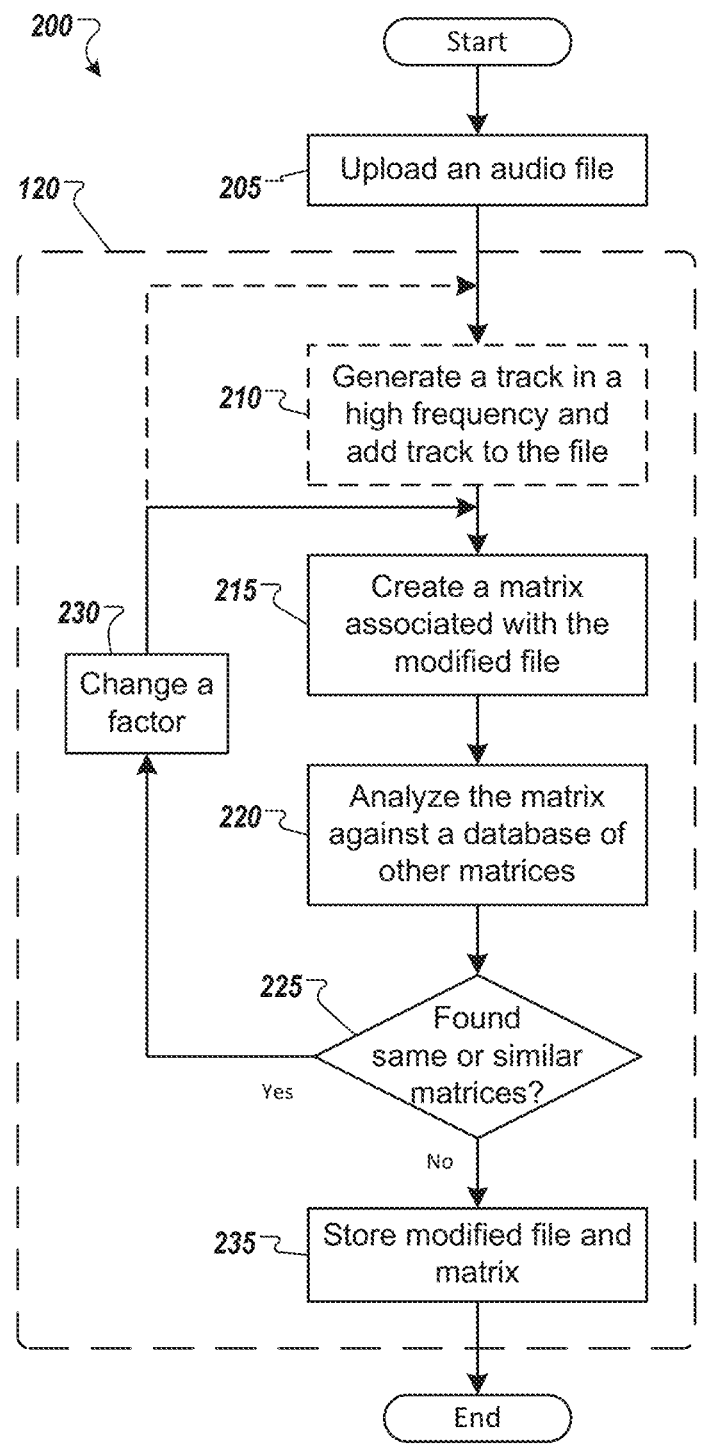
FIG. 2 illustrates an example process suitable for implementing some example embodiments according to the present inventive concept.

FIG. 2 illustrates an example process suitable for implementing some example embodiments according to the present inventive concept. One example of inputting media data into the MDP 120 may be by uploading a file (e.g., an audio file) (205). In this example, the media data are audio data, which may be contained in an audio file. In another example, the media data may be any combination of audio data, video data, images, and other data.

Audio file may be monophonic (i.e., single audio channel), stereophonic (i.e., two independent audio channels), or in another multichannel format, for example, but not limited to, 2.1, 3.1, 5.1, 7.1, etc. In some example embodiments, one channel of audio data may be processed. For example, a single channel monophonic audio file, one of the two channels stereophonic or multichannel audio file, or a combination, for example, an average of two or more channels of a stereophonic or multichannel audio file. In other example embodiments, two or more channels of audio data may be processed.

Figure 3A:
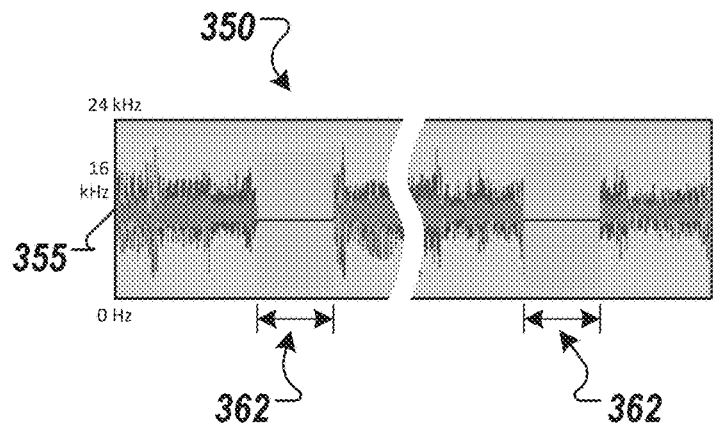
FIG. 3A illustrates a visual representation of an audio file.

FIG. 3A illustrates a visual representation of an audio file 350 that may be uploaded at 205 of FIG. 2. The audio file 350 may contain analog audio data and/or digital audio data. In some example implementations, analog audio data may be converted to digital audio data. One of ordinary skill in the art will appreciate that various methods of converting analog audio data to digital audio data may be employed without departing from the scope of the inventive concept. The audio file 350 may be encoded in any format, compressed or uncompressed, for example, but not limited to, WAV, mp3, AIFF, AU, PCM, WMA, M41, AAC, OGG, FLV, etc. The audio file 350 includes data which provides an audio track 355 (e.g., a monophonic channel or combination of two or more channels of audio data). The audio track 355 may have one or more portions 362 of silence. The audio track 355 may be illustrated as, for example, an audio wave or spectrum.

Figure 3B:
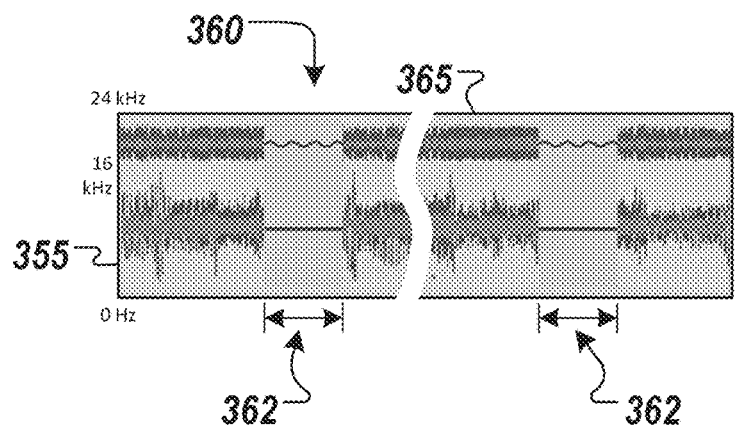
FIG. 3B illustrates the audio file of FIG. 3A with an added audio track.
Figure 4B:
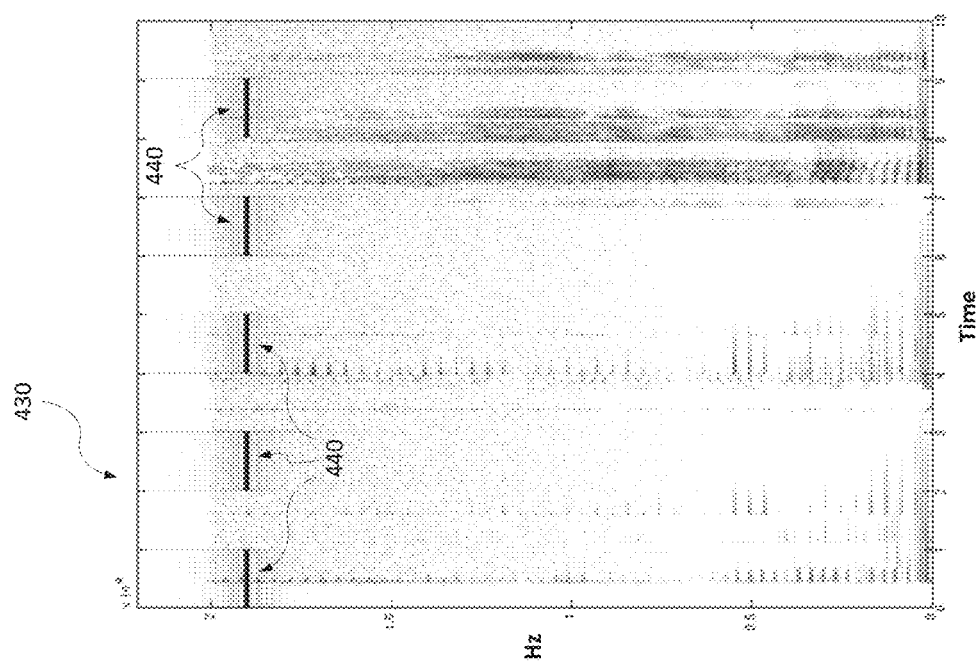
FIGS. 4A-C are spectrograms illustrating examples of fingerprint audio track generation.
Figure 4A:
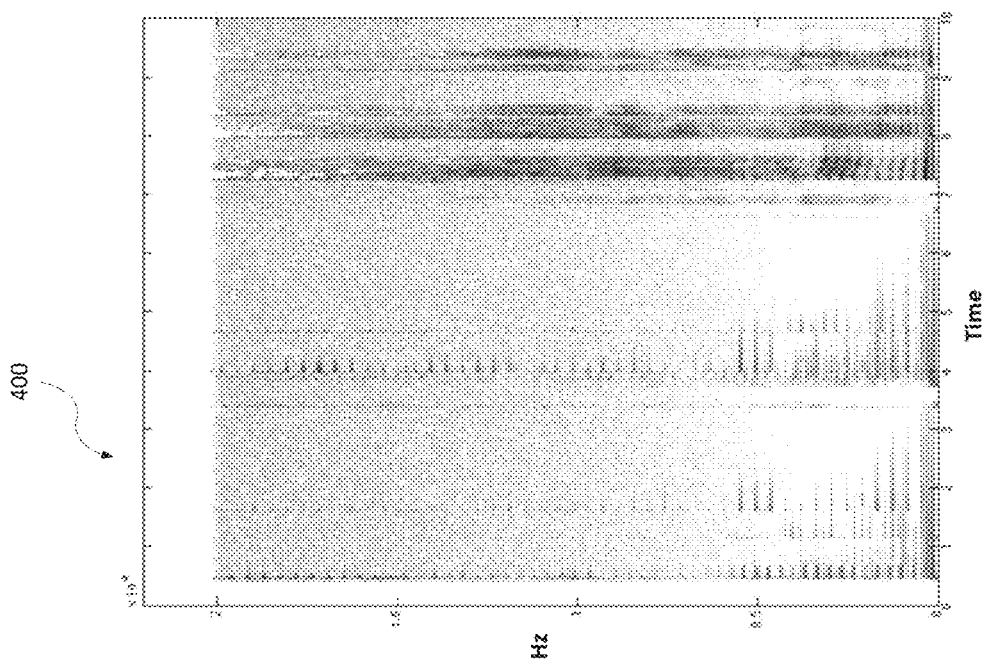
Figure 4C:
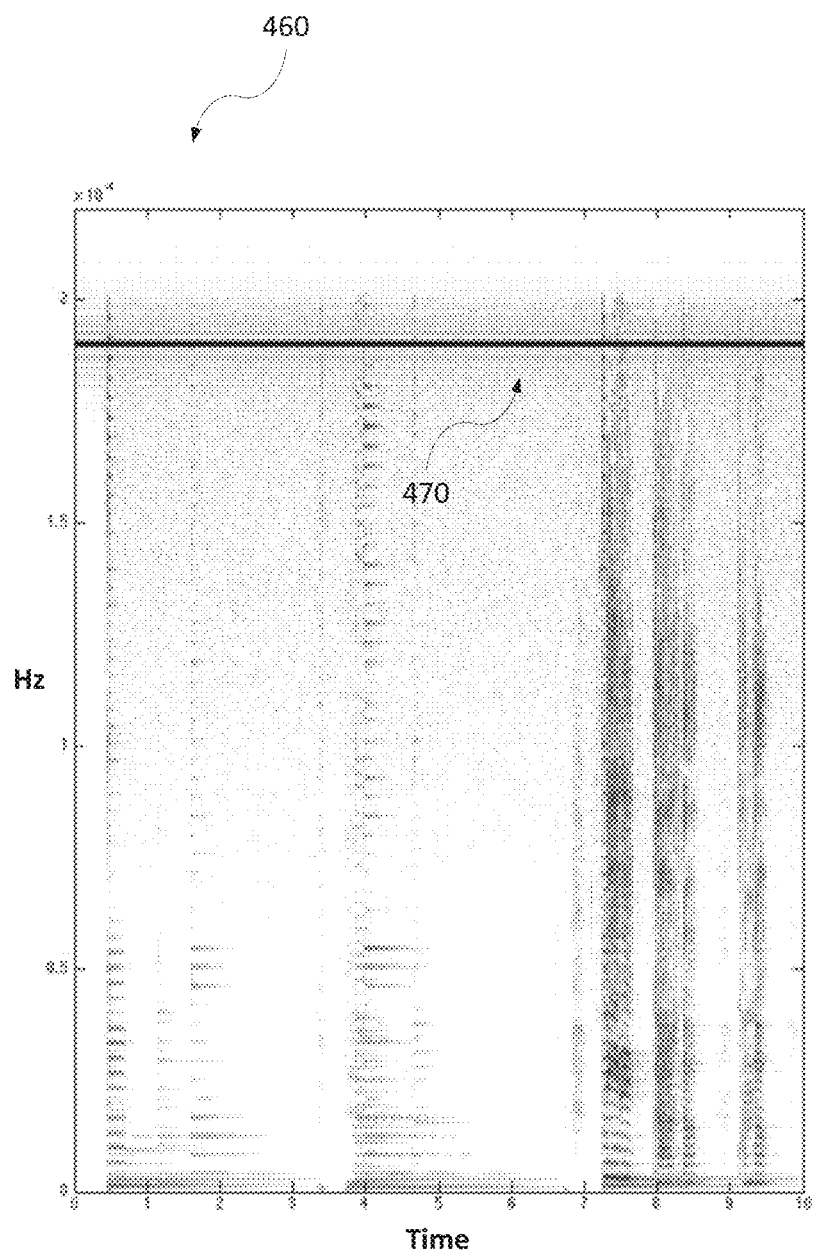

Referring to FIG. 2, an audio track in one or more frequencies (e.g., high frequencies) may be generated based on track 355 (210). FIG. 3B illustrates the audio file of FIG. 3A with an added audio track. Audio file 360 includes the audio track 355 and a "fingerprint" audio track 365. The fingerprint audio track 365 adds audio data to the audio file 360 to aid fingerprinting the audio file 360 in some situations, for example where audio the file 360 has a long silence period, frequent silence periods, and/or audio data concentrated in a small subset of the audio band or frequencies, etc. Generation of a fingerprint audio track at a high frequency is illustrated in FIGS. 4A-C and will subsequently be explained further.

Figure 3C:
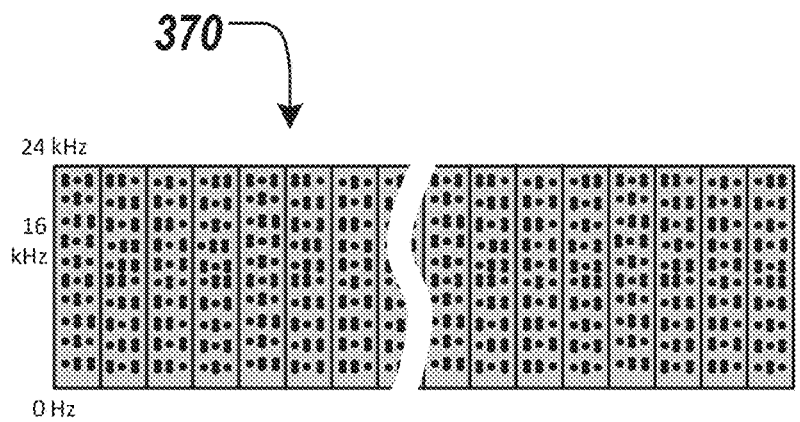
FIG. 3C illustrates a matrix generated based on an audio file.
Figure 5A:
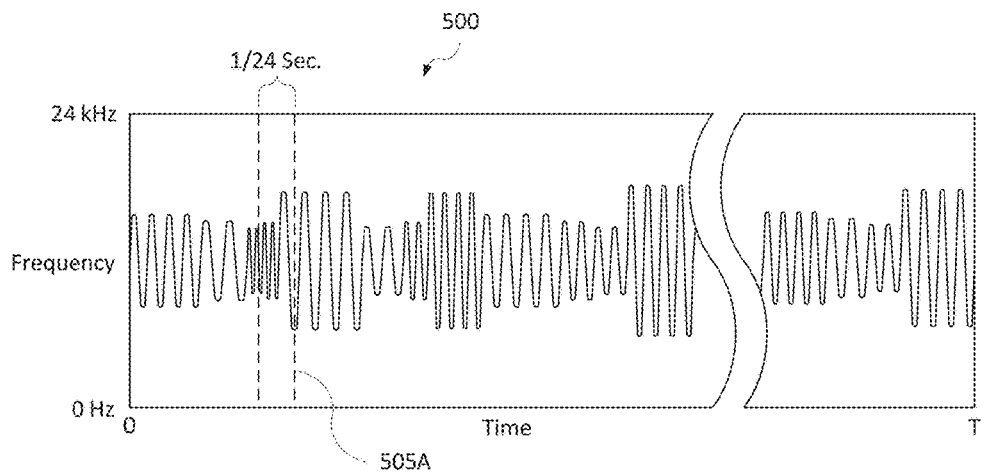
FIGS. 5A-G illustrate example processing of an audio file to generate one or more matrices.
Figure 5B:
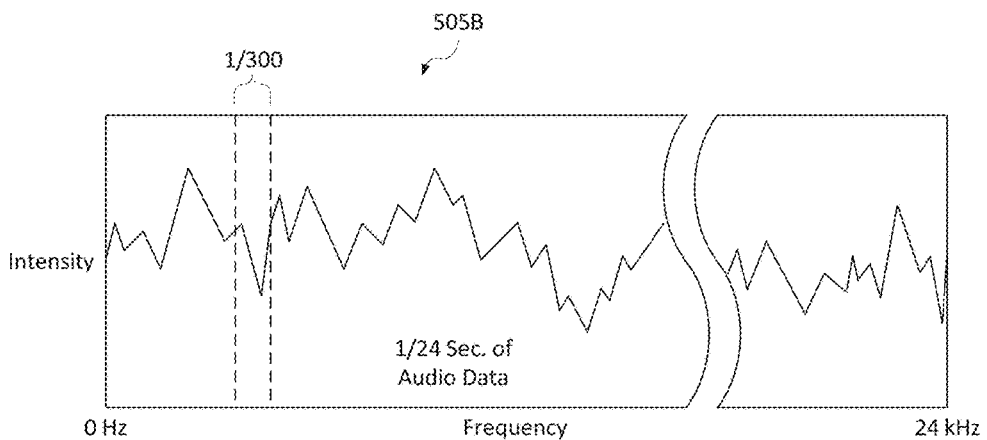

Referring to FIGS. 2 and 3C, a matrix 370 associated with an audio file may be generated (215). Audio signals or data of the audio file 350 or modified audio file 360 are processed to generate matrix 370 as illustrated in FIG. 3C. In some example embodiments, more than one matrix may be generated, i.e., at least one matrix based on an audio file and one or more matrices based on the at least one matrix. These matrices (if more than one) are collectively referred to as matrix 370 for simplicity. The generation of the matrix 370 is illustrated in FIGS. 5A-B and will subsequently be explained further.

Referring again to FIG. 2, the matrix 370 may be analyzed to determine whether there are same and/or similar matrices stored in database 140 (220). In some example embodiments, similarity between two matrices may be derived by comparing like parts of the matrices based on one or more acceptance threshold values. For example, some or all counterpart or corresponding elements of the matrices are compared. If there are differences, and the differences are less than one or more threshold values, the elements are deemed similar. If the number of same and similar elements is exceeds another threshold value, the two matrices may be considered to be the same or similar.

A matrix that is the same as or similar to another matrix implies that there is an audio file that is the same as or similar to the audio file 350 or 360 used to generate the matrix 370. If it is determined that a matrix in the database 140 is the same as or similar to the matrix 370 (225—Y), a factor is changed (230). The factor may be any factor used to generate the fingerprint audio track 365 and/or any factor used to generate the matrix 370. For example, one or more high frequencies may be changed to create a new fingerprint audio track 365. If the factor that is changed is a factor used to create the fingerprint audio track 365, the process 200 returns to the track generation operation (210) to generate another fingerprint audio track 365 and associated matrix 370. In implementations that do not include generation of another fingerprint audio track 365, the process 200 returns flows back to the matrix generation operation 215 to regenerate the matrix 370.

If it is determined that the database 140 does not contain a similar or same matrix as matrix 370 (225—N), the matrix 370 and/or the audio file 350 or 360 may be stored in one or more databases, for example database 140 (235). An implementation may ensure that the store operation 235 is eventually reached from the similarity comparison operation 225. For example, one or more threshold values may be changed with a number of iterations to guarantee that the store operation 235 is reached based on a specified threshold value.

An audio file may be associated with a unique identifier. Two or more audio files (e.g., audio files 350 and 360) may be used in different applications or the same applications.

In some example embodiments, an audio file 350 may be processed more than once to generate more than one corresponding matrix 370. For example, audio file 350 may be processed 10 times, where some of the processing iteration are performed with fingerprint audio tracks 365 and some of the processing iteration are performed without fingerprint audio tracks 365, to generate 10 corresponding matrices 370. The audio file 350 may be assigned 10 different identifiers to associate with the 10 corresponding matrices 370. The 10 "versions" of the audio file 350/matrix 370 pairs may be used in one or more products, services, and/or applications.

In some examples, the process 200 may be implemented with different, fewer, or more steps. The process 200 may be implemented as computer executable instructions, which can be stored on a medium, loaded onto one or more processors of one or more computing devices, and executed as a computer-implemented method.

FIGS. 4A-C are spectrograms illustrating examples of fingerprint audio track generation. FIG. 4A illustrates a spectrogram of audio data 400 before a fingerprint audio track is added. For example, the audio data 400 may correspond to the audio track 355 illustrated in FIG. 3A. The audio data 400 may be any length (e.g., a fraction of second, a few seconds, a few minutes, many minutes, hours, etc.). For purposes of explanation, only 10 seconds of audio data 400 is shown.

The vertical axes of the spectrograms of FIGS. 4A-C show frequencies in hertz (Hz) and the horizontal axes show time in seconds. Sounds or audio data are shown as dark spots, the darker the spot, the higher the sound intensity. For example, at seconds 1 and 2, dark spots are shown between 0 Hz to 5 kilohertz (kHz), indicating that there are sounds at these frequencies. At time=4 and 7-9, dark spots are shown at frequencies 0 Hz to about 2 kHz, indicating that there are sounds at a wider range of frequencies. Sound intensity is higher at time greater than 7 seconds.

FIG. 4B illustrates a spectrogram of audio data 430, which is audio data 400 of FIG. 4A with added fingerprint audio track 440 (corresponding to fingerprint audio track 365 in FIG. 3B). The fingerprint audio track 440 is added in some time intervals (e.g., 0-1 second, 2-3 second, etc.) and not in other time intervals (e.g., 1-2 second, 3-4 second, etc.). The fingerprint audio track 440 may be referred to as pulse data or non-continuous data.

The fingerprint audio track 440 is shown added in alternate intervals in the same frequency, for example a frequency at or near 19.5 kHz. In some example embodiments, a fingerprint audio track may be added in different frequencies. For example, an audio note at one frequency (Node 1) may be added in intervals 0-1 and 2-3 seconds, an audio note at another frequency (Node 2) may be added in another interval (e.g., interval 4-5 second), an audio note at a third frequency (Node 3) may be added in intervals 5.5-6 and 7-9 seconds, etc. Intervals where audio data are added and/or where no audio data is added may be in any length and/or of different lengths.

FIG. 4C illustrates a spectrogram of audio data 460, which is audio data 400 of FIG. 4A with added fingerprint audio track 470 (corresponding to fingerprint audio track 365 in FIG. 3B). The fingerprint audio track 470 is shown added in all time intervals (e.g., continuous data). The fingerprint audio track 470 is shown added in the same frequency, in this example a frequency at or near 19.5 kHz.

In some example embodiments, the fingerprint audio track 470 may be added in different frequencies. For example, an audio note at one frequency (Node 4) may be added in intervals 0-3 and 5-6 seconds, an audio note at another frequency (Node 5) may be added in another interval (e.g., interval 3-5 second), an audio note at a third frequency (Node 6) may be added in intervals 6-6.7 and 7-9 seconds, an audio note at a fourth frequency (Node 7) may be added in intervals 6.7-7 and 9-10 seconds, etc. Intervals where audio data are added may be in any length and/or of different lengths.

Audio data including the fingerprint audio track 440 and 470 may be in one or more frequencies of any audio range (e.g., between 0 Hz to about 24 kHz). In some example embodiments, the fingerprint audio track 440 and 470 may be in one or more frequencies above 16 kHz or other high frequencies (e.g., Note 1 at 20 kHz, Note 2 at 18.2 kHz, and Note 3 at 22 kHz).

High frequencies are frequencies about 10 kHz (kilohertz) to about 24 kHz. It is well known that some humans cannot hear sound above certain high frequencies. Thus, high frequency sound is inaudible or "silence" to these humans. For example, sound at 10 kHz and above may be inaudible to people 60 years old and older. Sound at 16 kHz and above may be inaudible to people 30 years old and older. Sound at 20 kHz and above may be inaudible to people 18 years old and older. The inaudible range of frequencies may be used to transmit data, audio, or sound not intended to be heard.

A range of high frequency sound may offer advantages. For example, high frequency audio data in an inaudible range may be used to provide services without interfering with listening pleasure. The range can be selected from high frequencies (e.g., from 10 kHz to 24 kHz) based on the target users for the implementation (e.g., in products that target different market populations). For example, a product that targets only users having a more limited auditory range may use audio data about 10 kHz to about 24 kHz for services without interfering with their listening activities. To target users or consumers having a broader auditory range, the range may be selected from about 20 kHz to about 24 kHz, since many such users may hear sound near or around 16 kHz.

Further advantages may include the ability of existing consumer devices (e.g., smart phones, radio players, TVs, etc.) to record and/or reproduce audio signals up to 24 kHz without special equipment, and sound compression standards (e.g., MP3 sound format) and audio transmission systems are designed to handle data in frequencies up to 24 kHz.

In some examples, the fingerprint audio track 440 and 470 may be added in such a way that it is in harmony with the original audio data 400. The fingerprint audio track 440 and 470 may be one or more harmony notes based on musical majors, minors, shifting octaves, other methods, or any combination thereof. For example, the fingerprint audio track 440 and 470 may be one or more notes similar to some notes of audio data 400, and generated in a selected high frequency range, such as in octaves 9 and/or 10.

Another example of adding harmonic audio data may be to identify a note or frequency, for example a fundamental frequency $f_0$ of an interval in which audio data is added. Identify a frequency range for the added audio data. Compute the notes or tones based on $f_0$ (e.g., $f_0$, $1.25*f_0$, $1.5*f_0$, $2*f_0$, $4*f_0$, $8*f_0$, $16*f_0$, etc.). Add one or more of these tones in the identified frequency range as additional audio data, pulse data or continuous data.

Referring to FIG. 3B, adding additional audio data (i.e., the fingerprint audio track 365) to original the audio data (i.e., track 355) may be referred to as signing the original audio data (i.e., the fingerprint audio track 365 is used to sign the audio data track 355). The audio file 360 may be consider "signed," because it contains a unique sound track, i.e., the fingerprint audio track 365, generated ad hoc for the file based on the audio data track 355. After adding an audio track, the audio file 360 may be provided to the submitter of the audio file 350 and/or provided to others, for example, but not limited to, users, subscribers, etc.). In some examples, the audio file 360 may be stored, for example in database 140 with a unique identifier, which can be used to identify and/or locate the audio file 360.

In some example embodiments, there may be more than one audio file generated for the audio data track 355. Each audio file may be generated with a track different from another generated track in another file.

FIGS. 5A-G illustrate example processing of an audio file to generate one or more matrices. FIG. 5A illustrates a visual representation of an example audio file 500 (e.g., the audio file 350 of FIG. 3A or 360 of FIG. 3B). The audio file 500 is visually represented with frequencies (e.g., 0 Hz to 24 kHz) on the y-axis and time on the x-axis.

In one or more operations, Fourier transform operations, for example, but not limited to, discrete Fourier transform (DFT) and/or fast Fourier transform (FFT), etc., may be used to reduce the amount of media data to process and/or to filter out data, for example noise and/or data in certain frequencies, etc. The Fourier transform, as appreciated by one skilled in the arts of signal processing, is an operation that expresses a mathematical function of time as a function of frequency or frequency spectrum. For instance, the transform of a musical chord made up of pure notes expressed by amplitude as a function of time is a mathematical representation of the amplitudes and phases of the individual notes that make up the chord. Each value of the function may be expressed as a complex number (i.e., complex amplitude) that can be interpreted as having a magnitude component and a phase component. The term "Fourier transform" refers to both the transform operation and to the complex-valued function it produces.

The audio file 500 may be processed by processing slices of audio data. Each slice may be 1/M of a second, where M may be 1, 4, 24, up to 8000 (8 k), 11 k, 16 k, 22 k, 32. k 44.1 k, 48 k, 96 k, 176 k, 192 k, 352 k, or larger. In this example, M is 24. A slice of audio data (e.g., slice 505A) contains ¹⁄₂₄ second of audio data.

FIG. 5B shows slice 505A in detail as slice 505B. Slice 505B is shown rotated 90 degrees clockwise. The y-axis of slice 505B shows signal intensity (i.e., the loudness of audio). The x-axis shows frequencies 0 Hz to 24 kHz. The audio data of slice 505B may be processed to produce numerical data shown in slice 505C in FIG. 5C using, for example, but not limited to, Fourier Transform operations. For example, slice 505B may be divided, (e.g., using Fourier transform) into N frames along the x-axis, where each frame is 1/N of the example frequency range of 0 Hz to 24 kHz. In some example embodiments, some or all of the N frames may overlap their adjacent frames.

Figure 5C:
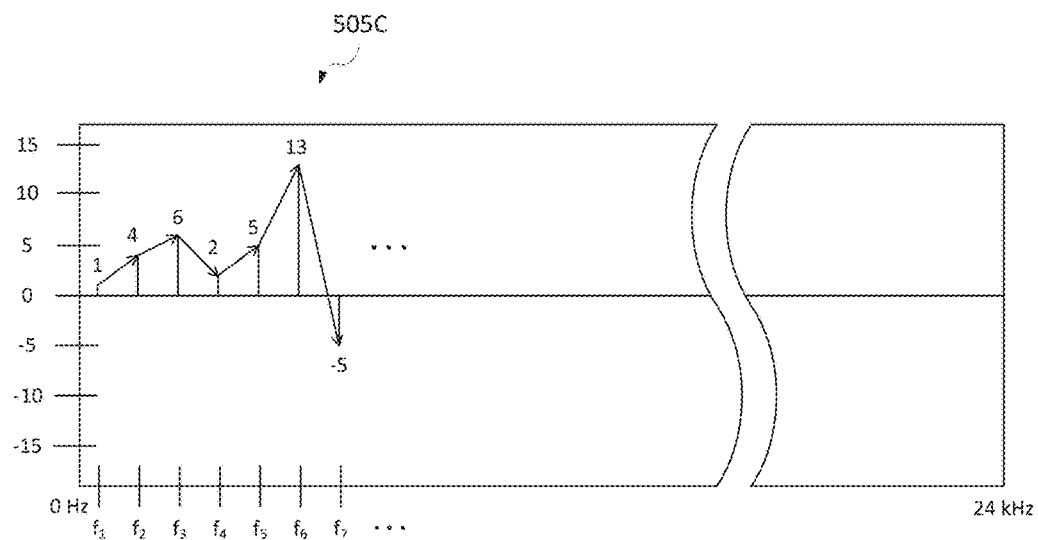

FIG. 5C shows an expanded view of slice 505B. The y-axis of slice 505C shows signal intensity. The x-axis shows frequencies 0 Hz to 24 kHz. Example intensity values of some frames f1-f7 are shown. In this example, the intensity values of frames f1 to f7=(1, 4, 6, 2, 5, 13, −5). In some example embodiments, an angle is computed for each frame. For example, an angle ($\alpha$) may be computed using two-dimensional vector Vn, where Vx is set to 1 and Vy is the difference between two consecutive frame values.

Here, V0=(Vx, Vy)=(1, 4-1)=(1, 3)

V1=(1, 6-4)=(1, 2)

V2=(1, 2-6)=(1, −2)

V3 to V299 are computed the same way.

Next, angles $\alpha_0$ to $\alpha_{299}$ are computed, where $\alpha_n$=arctan (Vny/Vnx) (e.g., $\alpha_1$=arctangent (V1y/V1x).

Figure 5D:
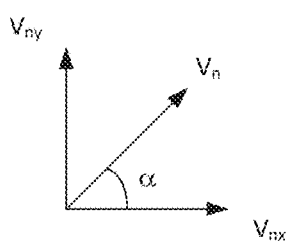
Figure 5E:
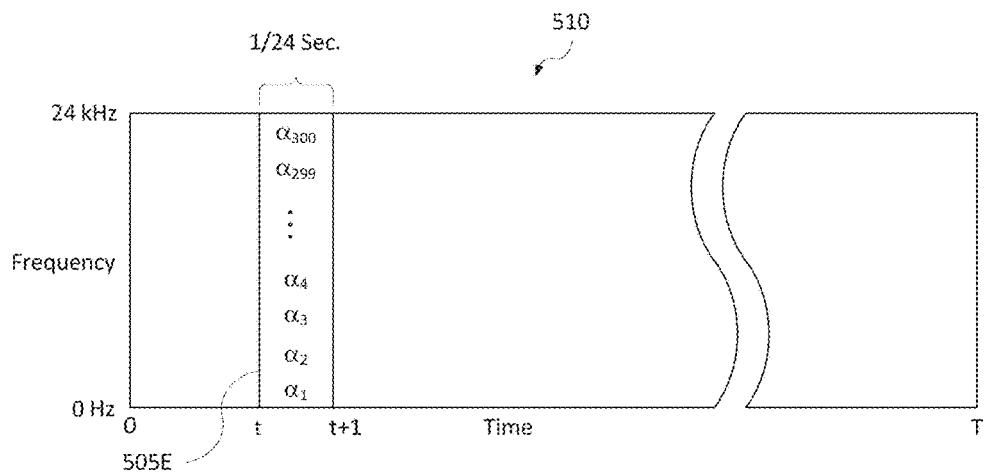

FIG. 5D shows slice 505C has been reduced to slice 505D of angle values. FIG. 5E shows slice 505D as slice 505E in the context of matrix 510. Slice 505E covers only ¹⁄₂₄ second of audio data. As an example, for a 30 second audio file, the matrix 510 includes 30×24=720 slices of 300 alpha values, making the matrix 510 a 300-by-720 matrix. The matrix 510 can be considered as a fingerprint of audio file 350 or 360.

Figure 5F:
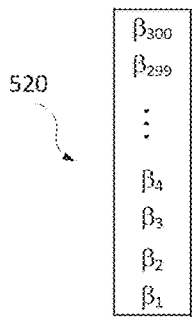

In some example embodiments, one or more filtered matrices based on or associated with the matrix 510 may be derived. For example, a filtered matrix may be created with the cross products of the $\alpha$ values of the matrix 510 with one or more filter angles, $\beta$. FIG. 5F shows an example column 520 of one or more $\beta$ values.

The $\beta$ values may be any values selected according to an implementation. For example, taking advantage of the fact that $\alpha \times \beta$ (cross product of $\alpha$ and $\beta$) equals zero (0) if $\alpha$ and $\beta$ are parallel angles, $\beta$ may be selected or determined to be an angle that is parallel to many $\alpha$ angles in the matrix 510 and/or other matrices. $\beta$ may be changed periodically or at any time. When a $\beta$ value is selected or determined, it may be communicated to a client processing application.

In the example of column 520, $\beta_1$ to $\beta_{300}$ may be the same value selected, for example, to be parallel or near parallel to the most numbers of angles in the matrix 510 and/or other matrices in database 140.

Figure 5G:
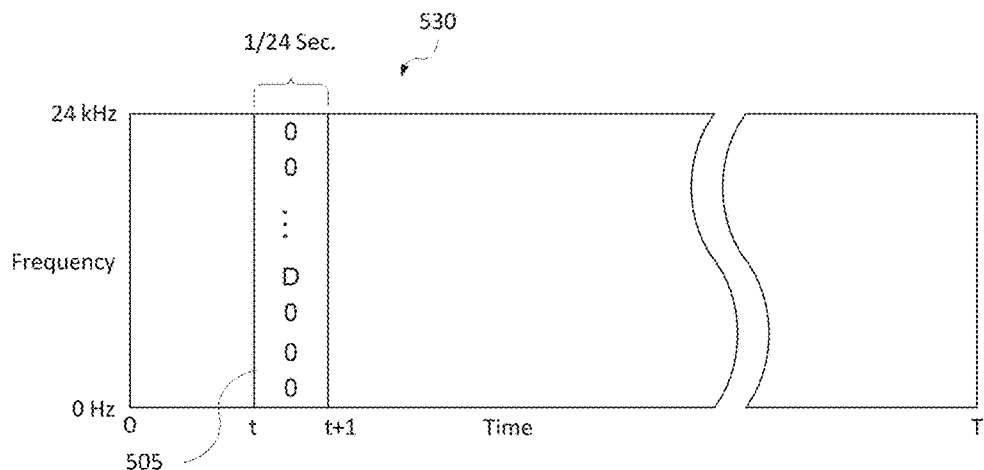

FIG. 5G shows a filtered matrix 530 with filtered value elements. For example, slice 505G shows filtered values that correspond to the $\alpha$ angles of slice 505E of the matrix 510 (see FIG. 5E). The filtered values of slice 505G are cross products of the $\alpha$ angles of slice 505E with the $\beta$ values of column 520 (see FIG. 5F).

The description of FIGS. 5A-G focuses on a single slice to illustrate how the corresponding slice in the matrices 510 and 530 may be created. The process to create the slice in the matrices 510 and 530 is applied to all the slices to create the entire matrices 510 and 530. In some example embodiments, the process to create the matrices 510 and 530 may be different, such as with fewer, more, or different operations.

Example Applications Using Signed or Fingerprinted Media

Figure 6:
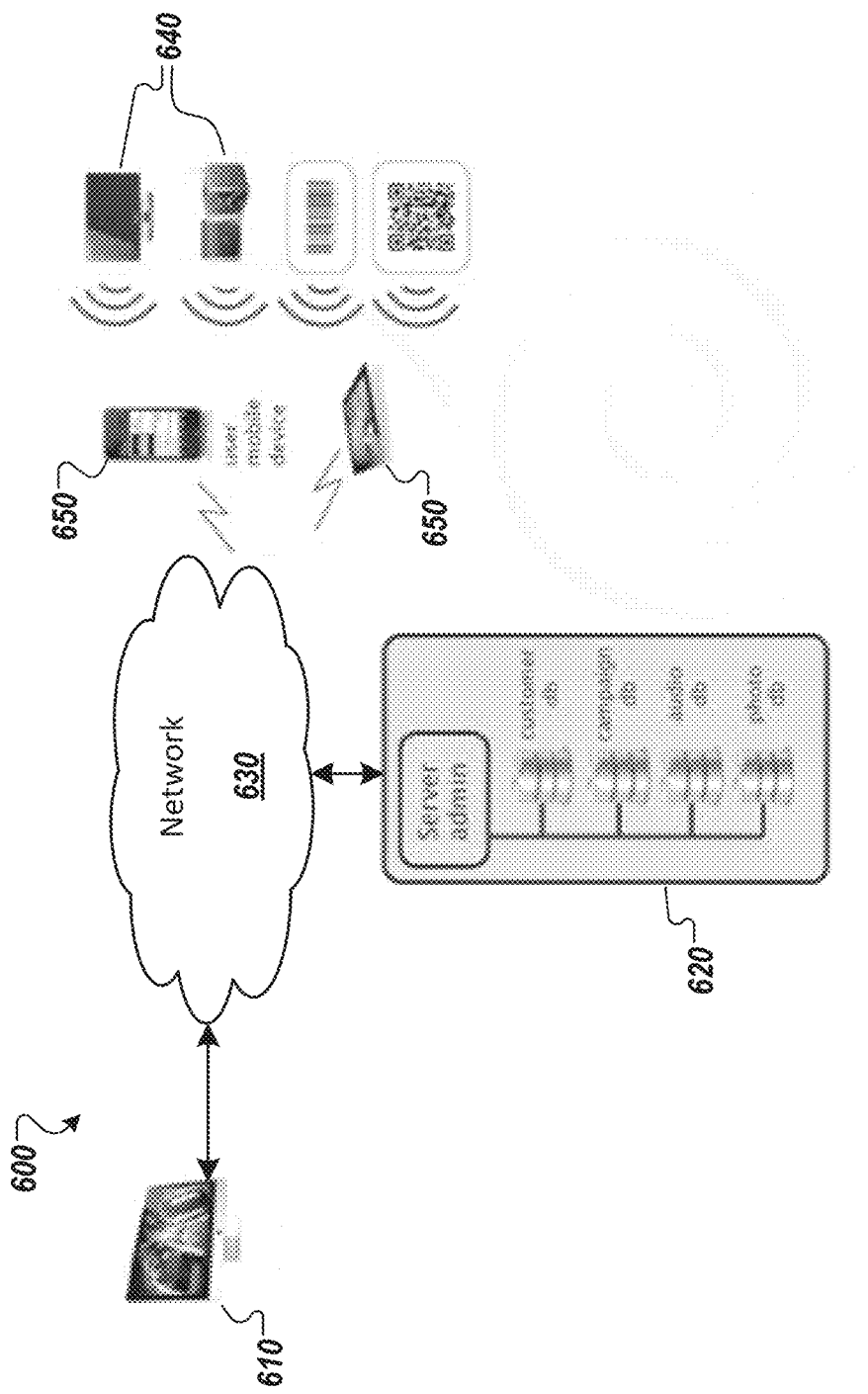
FIG. 6 shows an example environment in which example applications using electronic media signature can be implemented.

FIG. 6 shows an example environment in which example applications using an electronic media signature can be implemented. Environment 600 includes at least one media file provider 610, for example, but not limited to, a song publisher, advertiser, movie producer, etc., that communicates with at least one service provider 620 to acquire one or more fingerprints associated with a media file (e.g., audio file 350) as described above. The media file provider 610 may communicate with the service provider 620 via network 630.

A fingerprint may include one or more matrices. The fingerprints, matrices, and media files, if modified with one or more tracks, may be provided to the media file provider 610. In some example embodiments, fingerprints, matrices, and media files, modified and/or unmodified, may be retained or stored by the service provider 620, for example in database 140, to provide one or more services associated with the media files.

The matrices and/or the associated media file (e.g., audio file 350 or 360) stored in the database 140 may be associated with other information and/or content for providing various services. In some example applications, the media file, which may include a high frequency signature track, may be a song or music (Music M). The publisher of Music M obtained a fingerprint for Music M, for example by process 200 described above, and Music M may be associated with availability and/or purchase information, for example, but not limited to, where, when, and how to buy Music M, the purchase price, associated promotions, etc., in the database.

The media files may be provided to one or more media sources 640 to promote one or more services. A service can be any service, such as an advertisement of products and/or services, a purchase/sell opportunity, a request for more information, etc. For example, Music M may be made available to broadcasters, radio stations, Internet streaming providers, TV broadcasting stations, sport bars, restaurants, etc.

The environment 600 may include one or more media sources 640, for example, but not limited to, television (TV), radio, computer, and/or any source that provides, plays, and/or broadcasts audio and/or video media. Device 650 may capture or record media data, for example, a short segment of an advertisement, from a media source 640 when media source 640 is playing an advertisement for a product. The device 650 may process the media data to generate one or more matrices (i.e., client matrices) as described below with respect to FIG. 7, and send the client matrices and/or captured media data to service provider 620 via, for example, one or more networks 630.

Service provider 620 uses the client matrices and/or captured media data to identify one or more corresponding media as described below with respect to FIG. 8. Service provider 620 may provide the identified media file and/or provide one or more services associated with the identified media file.

Figure 7:
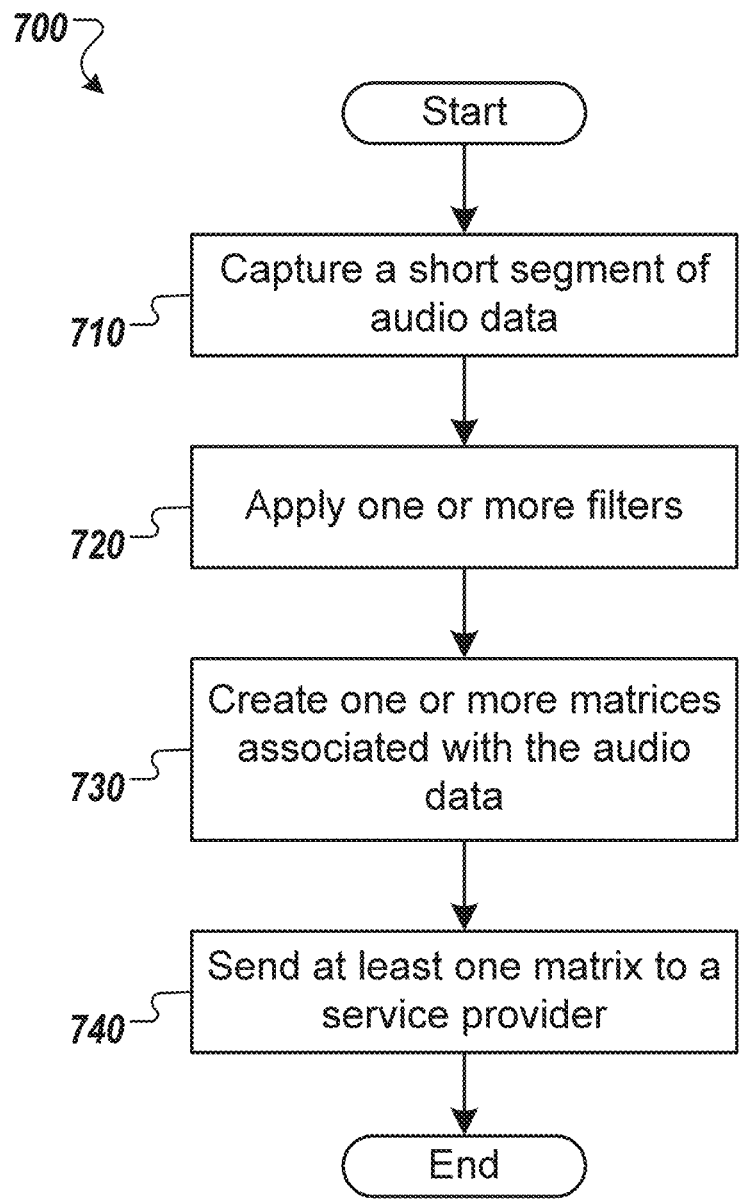
FIG. 7 is a flowchart of an example client process according to some example embodiments.

FIG. 7 is a flowchart of an example client process according to some example embodiments. Process 700 is described using the Music M example. When a user hears Music M being played, streamed, or broadcasted, the user may use a smart phone (e.g., device 650 in FIG. 6 or device 180 in FIG. 1) and press a record button associated with an application (App A). App A starts process 700 by, for example, recording or capturing a short segment (e.g., a second or a few seconds) of Music M (Segment S) (710). Segment S is media data (e.g., audio data). App A may be installed for at least the purposes of identifying the media data and/or associated services using a service provider.

In some example embodiments, App A may apply one or more filters or processes to enhance Segment S, to isolate portions of Segment S, for example to isolate certain frequency ranges, and/or filter or clean out noises captured with Segment S (720). For example, recording Segment S at a restaurant may also record the background noises at the restaurant. Well-known, less well-known, and/or new noise reduction/isolation filters and/or processes may be used, for example, but not limited to, a signal whitening filter, an independent component analyzer (ICA) process, a Fourier transform, and/or others.

App A may process the Segment S (e.g., a filtered and/or enhanced Segment S) to generate one or more matrices associated with the audio data of Segment S (730). For example App A may use the same or similar process as process 200 described above and illustrated in FIG. 2. In applications where Segment S already includes an additional track (e.g., a high frequency track), operations at block 210 of process 200 (FIG. 2) are omitted. In applications where Segment S does not include an additional track, operations at block 210 of process 200 (FIG. 2) may or may not be performed, depending on the applications and/or implementations.

App A generates matrices that are not the same as the matrices produced by process 200 due to noise and size. Media data with noise are not the same as noise-free media data. Therefore, matrices produced by App A using media data captured with noise are not the same as those produced by process 200 using noise-free media data (e.g., uploaded media data).

App A processes the media data (e.g., Segment S) that may be a subset (e.g., shorter in duration) of the media data processed by process 200. For example, process 200 may process the entire song (e.g., Music M), and App A may process only a few seconds or less of Music M (e.g., Segment S). For example, Music M may be used in a 30-second advertisement, and Segment S may be a recording of about three seconds of the advertisement. With a ratio of 10 to 1 (i.e., 30 seconds to 3 seconds), the matrices generated with Segment S are about $\frac{1}{10}$ the size of the matrices generated with Music M.

With an example sampling rate of 24 samples per second, multiplied by 30 seconds, and a division of the audio frequency range (e.g., 0 Hz to 24 kHz) into 300 sub-ranges, process 200 produces a 300-by-720 matrix (Big M) of $a$ values as described above. App A generates a 300-by-72 matrix (Small M) of $a$ values. If Segment S is the first three seconds of Music M, $a$ values in Small M would equal to the $\alpha$ values of the first 72 columns of a Big M (if noise in Segment S is eliminated). If Segment S is seconds 9, 10, and 11 of Music M, $\alpha$ values in Small M would equal to the $\alpha$ values of columns 193 to 264 of a Big M (if noise in Segment S is eliminated). If Segment S is the last three seconds of Music M, $\alpha$ values in Small M would equal to the $\alpha$ values of the last 72 columns of a Big M (if noise in Segment S is eliminated). The number of sub-ranges (e.g., 300) is only an example. One of ordinary skill in the art will appreciate that other numbers of sub-ranges may be used in processes 200 and 700 without departing from the scope of the inventive concept.

App A (may produce a filtered matrix (Small F) corresponding to Small M using the same $\beta$ value received from the service provider that produces a filtered matrix (Big F) corresponding to Big M. Sizes and ratio of Small F and Big F are the same as those of Small M and Big M. Small F may be generated using the same or similar process described in FIG. 2.

App A sends the Small F, Small M, and/or Segment S (pre-filtered or post-filtered) to the service provider 620 (740). In some examples, process 700 may be implemented with different, fewer, or more steps. For example, the operations of one or more of blocks 720 and 730 may be performed by the service provider 620 instead of or in addition to the operations performed by App A. For example, App A may send the pre-filtered Segment S to the service provider 620 after the operations at block 710 or send the post-filtered Segment S to the service provider 620 after the operations at block 720.

Process 700 may be implemented as computer executable instructions, which can be stored on a medium, loaded onto one or more processors of one or more computing devices, and executed as a computer-implemented method.

Figure 8:
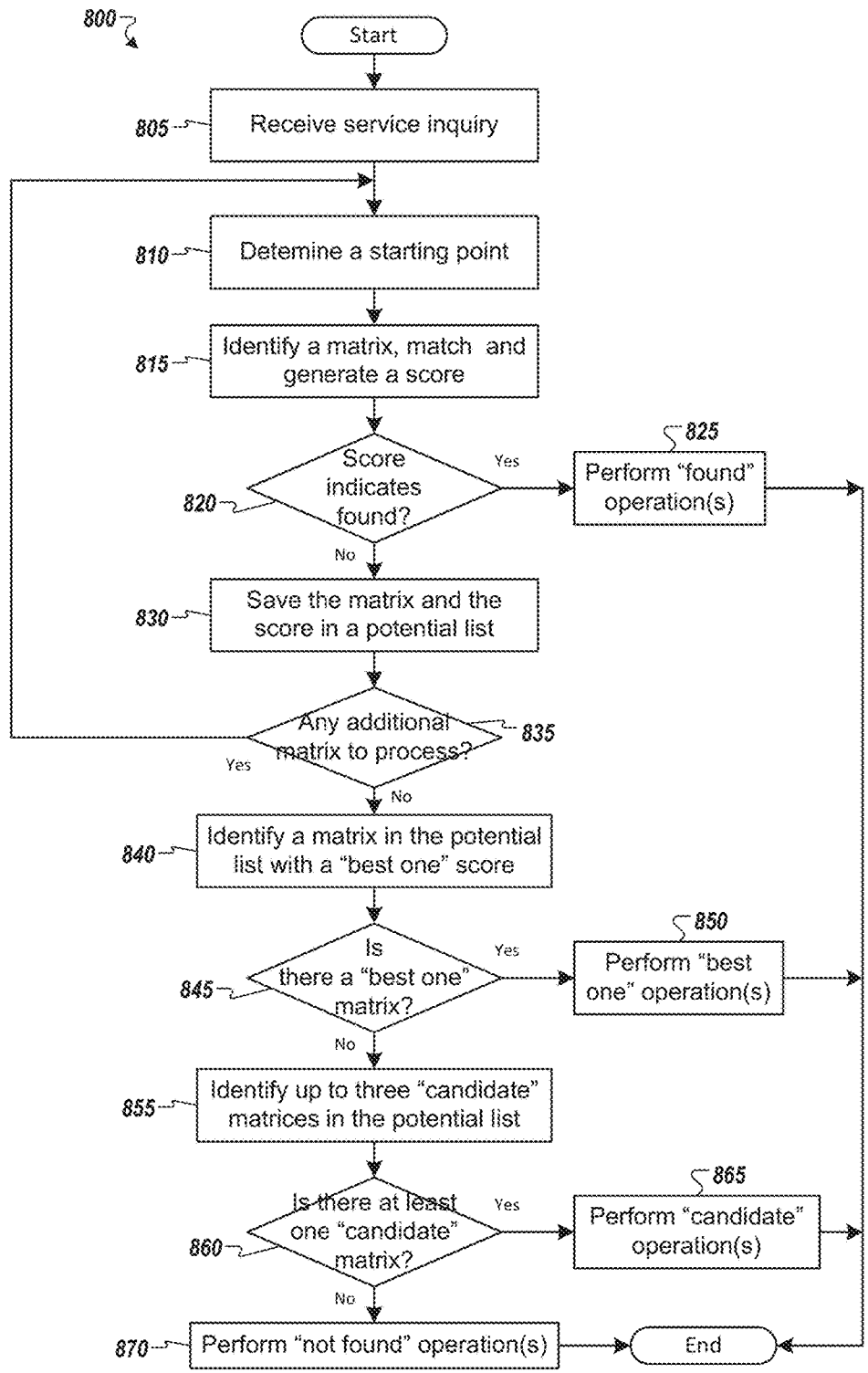
FIG. 8 is a flowchart of an example service provider process according to some example embodiments.

FIG. 8 is a flowchart of an example service provider process according to some example embodiments. Process 800 starts when service provider (e.g., service provider 620) receives a service inquiry (805). For example, the service provider 620 may receive the Small F, Small M, and/or Segment S from a client device that captured the Segment S media data. In an example implementation, Small F is received by the service provider 620. The service provider 620 determines a starting point (810). Any point may be a starting point, such as starting from the oldest data (e.g., oldest Big F). However, some starting points may lead to faster identification of the Big F that corresponds with the Small F.

One example of determining a starting point may be using data indexing techniques. For example, to identify the corresponding Big F faster, all the Big Fs may be indexed using extreme (e.g., the maximum and minimum) values of the of the sampled data. There are 720 maximum values and 720 minimum values in a 300-by-720 Big F matrix. These 720 pairs of extreme values are used to index the Big F. When the Small F is received, extreme values of the Small F are calculated to identify a Big F using the index to determine the starting point.

Further examples of determining a starting point may use one or more characteristics or factors relating to, for example, but not limited to, the user who recorded Segment S, the time, the location, etc. For example, the location of the user may indicate that the user is in California. With that information, all media files (i.e., the associated matrices) that are not associated with California may be eliminated as starting points. If Segment S is received from a time zone that indicates a time past midnight at that time zone, most media files associated with most children's products and/or services may be eliminated as starting points. Two or more factors or data points may further improve the starting point determination.

When a starting point is determined or identified, a matrix (e.g., a Big F) is identified or determined and a score is generated (815). In some example embodiments, identifying a starting point also identifies a matrix.

The score may be generated based on the Small F and Big F. Using the example of $\frac{1}{10}$ ratio of Small F/Big F, the Small F may need to align with the correct portion of Big F to determine the score. In one example, Big F may be divided into portions, each at least the size of Small F. The portions may be overlapping. In the example of a three-second Small F, each portion of the Big F is at least three second worth of data. One example may be having six-second portions overlapping by three seconds (e.g., portion 1 is seconds 1-6, portion 2 is seconds 4-9, portion 3 is seconds 7-12, etc.).

With an example sampling rate of 24 times per second, Small F would cover 72 samplings and each portion of Big F would cover 144 samplings. One process to determine a score may be as follows.

```
For p = 1 to 9; // nine overlapping 6-second portions
    P_score[p] = 0; // portion scores
    For i = 0 to 72; // 73 overlapping 72 samples per
    portion
        Score[i] = 0;
        For s = 1 to 72;
            compare sample score = Compare Small F[s] with
        Big F [(p*72) +i+s];
            Score[i] = Score[i] + compare sample score;
        End For s
    End For i
    P_score[p] = the minimum of Score[i], for i = 0 to
    72;
End For p
Final score = the minimum of P_score[p], for p = 1 to
9;
```

Comparing a sample of Small F (e.g., 300 filtered values that mainly equal to zero) to a sample of a portion (e.g., another 300 filtered values that mainly equal to zero) may be summing up the difference between 300 pairs of corresponding filtered values. For example, the "Compare" operation may be implemented as the following loop.

For j=1 to 300;
    compare sample score=compare sample score+(Small F[s][j]−Big F[(p*72)+i+s] [j]);
End For j The final score (e.g., the score obtained from processing the Small F with one Big F) is used to compare to one or more threshold values to determine whether a corresponding Big F has been found. Finding the corresponding Big F would lead to finding Music M. In some example embodiments, one or more threshold levels may be implemented. For example, there may be threshold values of X, Y, and Z for the levels of "found," "best one," "candidate," and "not found." A final score between 0 and X may be considered as "found." A final score between X+1 and Y may be considered as "best one." A final score between Y+1 and Z may be considered as "candidate." A final score greater than Z may be considered as "not found."

If the final score indicates "found" (820—Y), one or more "found" operations are performed (825). "Found" operations, "best one" operations, "candidate" operations, and "not found" operations may be based on the product(s) and/or service(s) associated with the media file (e.g., Music M) associated with the "found" Big F. For example, Music M may be associated with selling the music. Information associated with Music M, for example, description, where, when, and how to buy Music M, the purchase price, associated promotions, etc., may be sent to the device 650. In some example embodiments, a "Buy Now" button may be activated on the device 650. A user using the device 650 may press the button on the device to purchase or download Music M.

At 820, If the final score does not indicate "found" (820—N), save the final score and the Big F matrix associated with the final score in, for example, a potential list (830). If the saved Big F is not the last Big F (e.g., there is at least one Big F not processed yet) (835—Y), the process 800 returns to determine a starting point for the next Big F (810). Otherwise (835—N), the process 800 identifies a Big F with a final score in the "best one" level (840).

If there is a "best one" score (a lowest "best one" score may be selected if there is more than one) (845—Y), the process 800 performs the "best one" operations (850). For example, the "best one" operation may be the same as or similar to the "found" operations. In some example embodiments, the "best one" operations may altered or different from the "found" operation. For example, additional information may be provided (e.g., displaying a message "Would you like to see other similar music?").

If there is no "best one" score (845—N), up to three "candidate" Big Fs in the potential list are identified (select top three if more than three) (855). If there is at least one "candidate" Big F (860—Y), the process 800 performs the "candidate" operations (865). For example, information of three songs associated with the three Big Fs are provided and an option may be given to select one or more of the provided songs to download, listen to, purchase, etc.

In some example embodiments, the top three, top five, or top N "candidate" Big Fs may be selected based on one or more criteria. Example criteria may include, but are not limited to, popularity, age of the media file associated with a Big F, top user picks in the last time period (e.g., six hours, three days, two weeks, one month, etc.). Additional examples include rank of the media file and/or one or more other parameters, for example, but not limited to, the geographical location of a user on the device 650, the day of the week the query is made, the language or nationality of the user making the query, user preference, etc.

If there is no "candidate" Big F (860—N), the process 800 performs the "not found" operations (870). For example, a message indicating cannot locate a match may be provided. Instructions may be provided to record a better Segment S. A user on the device 650 may be given an opportunity to manually locate or search for Music M. For example, the user may be presented with a user interface on the device 650 for entering one or more queries (e.g., by keywords).

In some examples, the process 800 may be implemented with different, fewer, or more steps. The process 800 may be implemented as computer executable instructions, which can be stored on a medium, loaded onto one or more processors of one or more computing devices, and executed as a computer-implemented method.

Additional Application Examples

In some example applications, media signatures or fingerprints can be used in product placement and/or advertisement. For example, the ability to automatically identify sounds or videos enables service providers and/or vendors to distinguish between two or more advertisements, even those with similar sounds and/or videos.

For example, a vendor (Vendor V) may produce a radio or TV advertisement. Vendor V uploads a media file, which includes video data and audio data, to a service provider (e.g., TV station). The TV station signs and fingerprints the media file (e.g., using a tool or a service described above in FIG. 2) and stores one or more signed media files and matrices in a database. The fingerprints may be based on the video data and/or audio data.

The signed media files are associated with one or more advertisements for products and/or services. For example, the advertisements may include methods of delivery, discounts, coupons, time-sensitive deals, volume purchase incentives, free test use of software, online seller information, and an attractive "buy now" incentive.

A viewer (Viewer V) of an advertisement may record (e.g., using a device) a portion of the advertisement, and use the recorded segments to identify the products and/or services being advertised. For example, Viewer V may send the recorded portion (e.g., a few seconds of the sound and/or video of the advertisement) to Vendor V. Vendor V may process the portion to generate a fingerprint of the portion (e.g., partial fingerprint of the media file associated with the advertisement). Using the partial fingerprint, Vendor V may identify the advertisement and/or other similar advertisements (e.g., advertisements associated with media files having fingerprints similar to that of the one being searched for).

Products and/or services being advertised are presented to Viewer V (e.g., sent to Viewer V's mobile device) for viewing and/or purchasing. If more than one advertisement is located, the advertisements and/or the associated products and/or services may be sent to Viewer V in the order of probability. The list of advertisements is based on a matching rank of the media file and/or one or more other parameters (e.g., the geographical location of Viewer V, the day of the week the query is made, the language or nationality of the Viewer V making the query, user preference, and etc.).

If no advertisement is located, Viewer V is given an opportunity to manually locate or search the advertisement and/or associated products and/or services. For example, Viewer V may be presented a voice interface for entering one or more verbal queries (e.g., by keywords).

Figure 10:
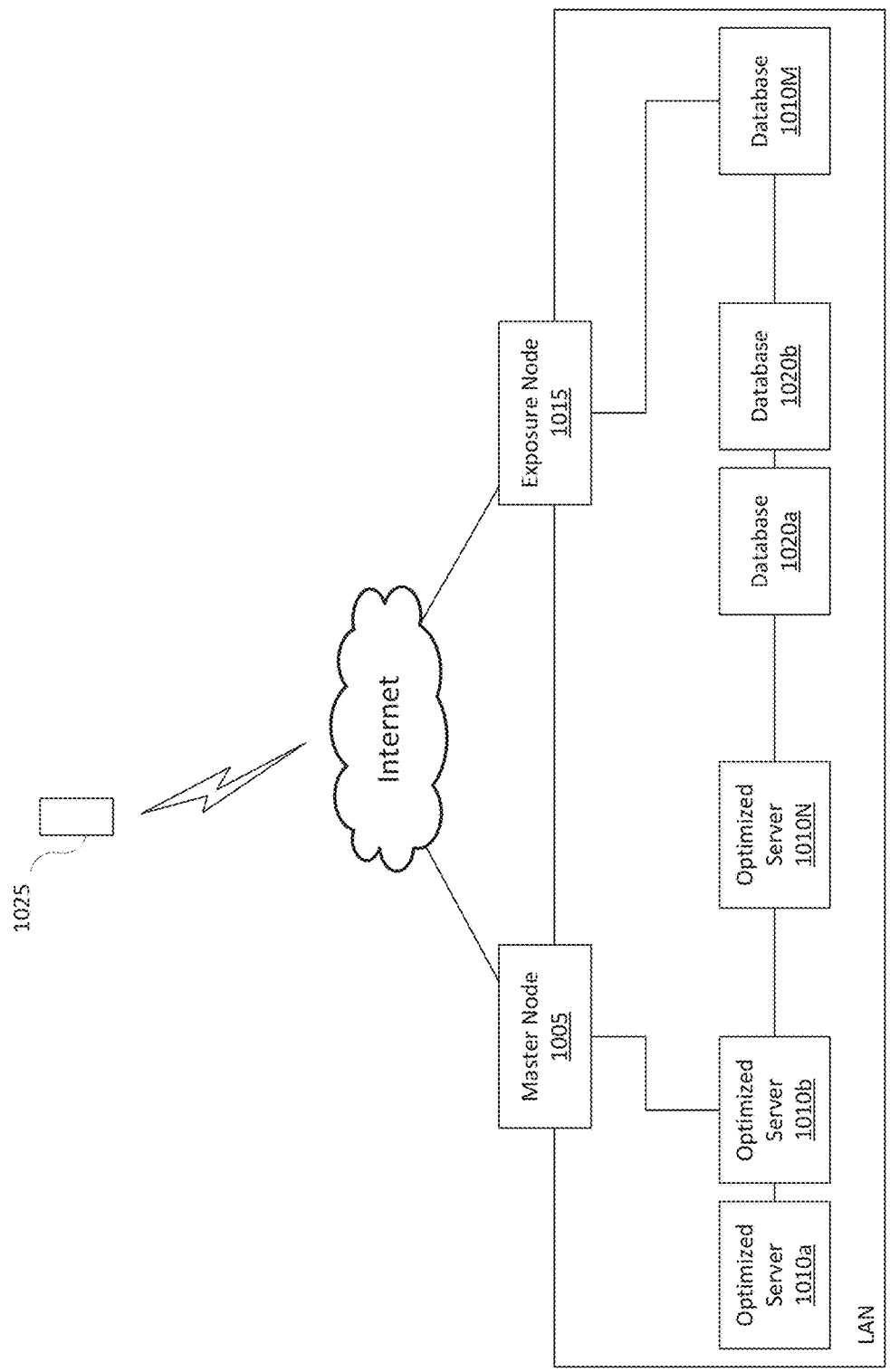
FIG. 10 illustrates an audio file matching system utilizing a plurality of servers according to an example embodiment of the present inventive concept.

In another example embodiment, a plurality of optimized servers may be used to analyze and match audio files present in different types of media. FIG. 10 illustrates an audio file matching system utilizing a plurality of servers according to an example embodiment of the present inventive concept. As illustrated in FIG. 10, an audio file may be received by a master node 1005. The master node 1005 distributes the audio file to the plurality of servers 1010a-1010N. Each server 1010a-1010N may employ a media data analysis engine having an algorithm optimized for analyzing and matching an audio file present in a particular type of media taking into account various considerations based on the types of media. Different optimized algorithms may be employed among the servers. For example, one server may employ a media data analysis engine having an algorithm optimized to identify an audio file in a film score, another server may employ a media data analysis engine having an algorithm optimized to identify an audio file in a TV show, and yet another server may employ a media data analysis engine having an algorithm optimized to identify an audio file in a YouTube video. The servers employing optimized media data analysis engines are hereinafter referred to as optimized servers. Other optimized servers may include servers dedicated to songs and advertisements.

The master node 1005 and optimized servers 1010a-1010N may be configured in a local area network (LAN). The master node 1005 may have an internal IP address to communicate with devices on the LAN and an external IP address for external communication, for example via the internet. Each of the optimized servers communicates with a database 1020a-1020M or portion of a database containing corresponding media types. One of ordinary skill in the art will appreciate that servers may be optimized to identify audio files in other types of media without departing from the scope of the present inventive concept. In addition, an exposure node 1015 communicates via the internet to provide data related to an identified audio file. The exposure node 1005 may have an internal IP address to communicate with devices on the LAN and an external IP address for external communication, for example via the internet. Related date obtained by the exposure node 1015 is associated to one or more audio files stored in the database 1020a-1020M. When an optimized server 1010a-1010N determines a match for a received audio file, the database 1020a-1020M is also queried for additional related data, and the related data is returned to the user as part of the match results.

In the example embodiment, an audio file may be sent to the master node 1005 "on-the-fly" in real-time as it is being captured by a user device 1025. The audio file may be distributed by the master node 1005 to more than one server of the plurality of optimized servers 1010a-1010N, or may be sent to each server of the plurality of optimized servers 1010a-1010N. The system may automatically balance the load by distributing audio file processing across more servers during peak service demand times.

Each of the plurality of optimized servers 1010a-1010N may create multiple instances of the analysis process for matching an audio file. Thus, each server can handle multiple instances or threads to process audio files. A queuing system may be provided such that all audio files are sequentially processed as they are sent to the servers.

Analysis and matching of an audio file present in different types of media may require different amounts of time based on the media type. For example, an audio match against a song may take only a few seconds while an audio match against a film may take more time. Results of the analysis and matching are returned to the master node 1005 which returns the results to the user as a live stream. Since a received audio file is processed by a plurality of servers 1010a-1010N, results may be returned to a user progressively as each server completes the processing of the file. A list of results organized by media category, for example, music, film, etc., or filtered based on rules defined by the user, may be presented to the user permitting the user to obtain more details associated with the audio file.

Different criteria for determining a match may be set for each server optimized for a specific media type. For example, thresholds for triggering a match may be set at a first level for servers optimized for one media type (e.g., songs) while the thresholds for triggering a match may be set at a second level for servers optimized for another media type (e.g., TV show). The matching thresholds are therefore dynamic and modifiable.

Audio file analysis may be performed using a transform process, for example, but not limited to, Fourier transform, fast Fourier transform (FFT), or Stockwell transform. One of ordinary skill in the art will appreciate that other transform processes may be used without departing from the scope of the present inventive concept.

Received audio tracks are fingerprinted for storage in the databases. In one embodiment, an FFT is used for the spectral analysis of the audio track. One-thousand-twenty-four samples of each second of audio are overlaid on different sections. In other words, a total of one-thousand-twenty-four overlays are made for each second of the audio file analyzed. A high pass and low pass filter are applied to the files received by the matching server to remove possible background noise, for example wind or ambient room noise, which may have been captured together with the audio of interest. The audio file is analyzed for its peak levels which are then stored as hashes in the database. The peak levels are calculated within the section of the file is being analyzed. Therefore, within a single file that is made up of a number of different sections, the peak level in one section will be different compared to the peak level in another section depending on the type of audio that is present in the file.

Hashes that are present across a number of different audio files are automatically removed from the database to maintain its efficiency. For example, a hash present in 100,000 database records cannot be used to create a unique identifier for the purposes of matching an audio file and would therefore be deleted from the database.

The overlap size being used to match audio files that have been sent by the client can be wider than one user for the creation of the database. The relative time period that is used to calculate the peaks in a section of an audio file can be longer or shorter. This permits the system to be more accurate and highlight greater detail when required.

A solid-state disk with RAM may be used to manage and increase the speed of generating fingerprints and hashes. The server manages the disk memory so as to keep frequently requested files in the RAM to permit faster matching and return of results to the user. The disk memory uses a random-access technique that calculates in parallel, through the identification of the fingerprint in the disk, in such a way as to provide a response time similar to the RAM process. In addition, at the system level, SSD are configured in such a way as to obtain performance benefits with the user of Raid 0, Raid 5, and other configurations.

Example Computing Devices and Environments

Figure 9:
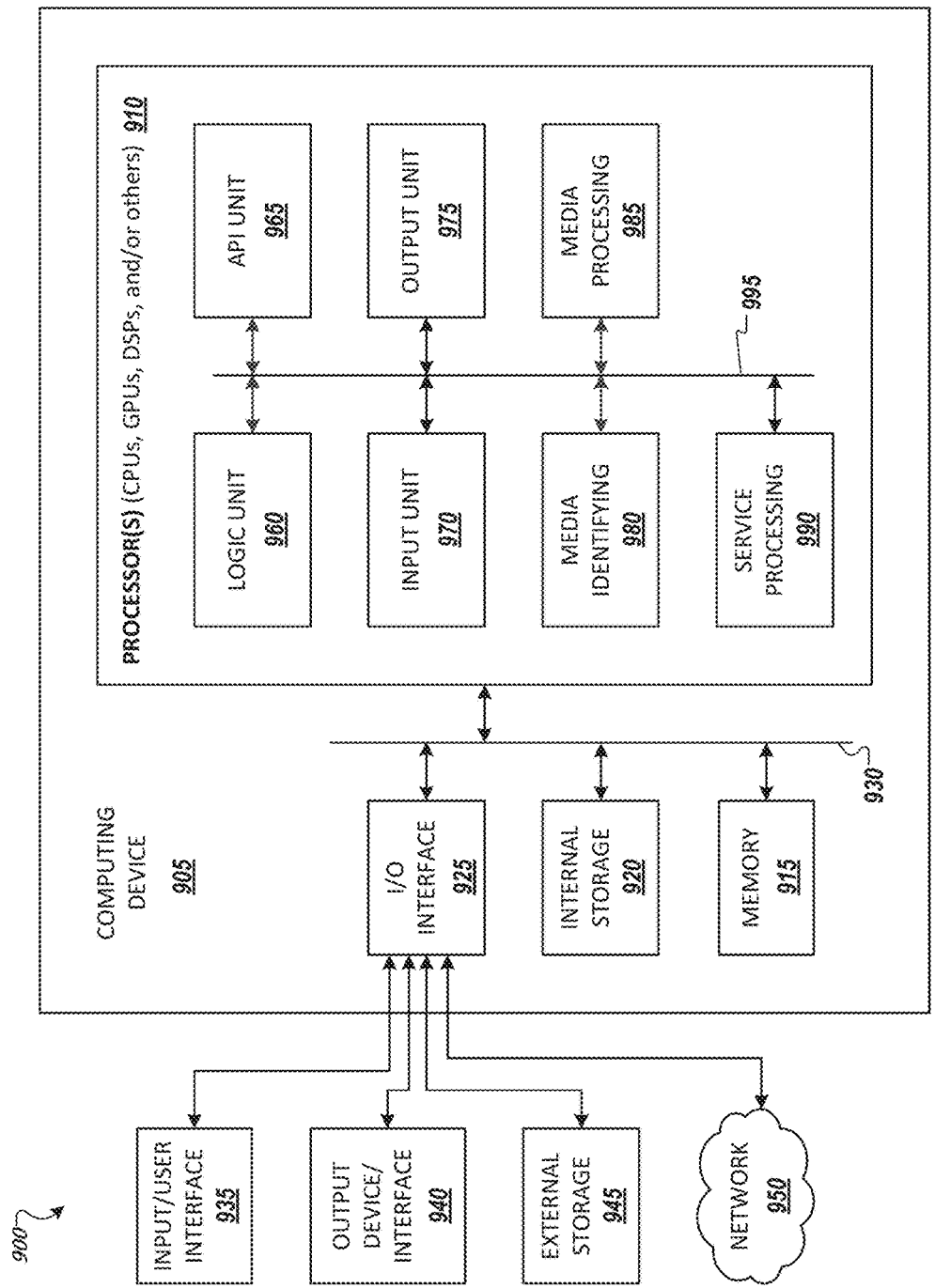
FIG. 9 shows an example computing environment with an example computing device suitable for implementing at least one example embodiment.

FIG. 9 shows an example computing environment with an example computing device suitable for implementing at least one example embodiment. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and I/O interface 925, all of which can be coupled on a communication mechanism or bus 930 for communicating information. Processors 910 can be general purpose processors (CPUs) and/or special purpose processors (e.g., digital signal processors (DSPs), graphics processing units (GPUs), and others).

In some example embodiments, computing environment 900 may include one or more devices used as analog-to-digital converters, digital-to-analog converters, and/or radio frequency handlers.

Computing device 905 can be communicatively coupled to input/user interface 935 and output device/interface 940. Either one or both of input/user interface 935 and output device/interface 940 can be wired or wireless interface and can be detachable. Input/user interface 935 may include any device, component, sensor, or interface, physical or virtual, which can be used to provide input (e.g., keyboard, a pointing/cursor control, microphone, camera, Braille, motion sensor, optical reader, and/or the like). Output device/interface 940 may include a display, monitor, printer, speaker, braille, or the like. In some example embodiments, input/user interface 935 and output device/interface 940 can be embedded with or physically coupled to computing device 905 (e.g., a mobile computing device with buttons or touch-screen input/user interface and an output or printing display, or a television).

Computing device 905 can be communicatively coupled to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. To implement a described embodiment, one or more applications can be deployed that include logic unit 960, application programming interface (API) unit 965, input unit 970, output unit 975, media identifying unit 980, media processing unit 985, service processing unit 990, and inter-unit communication mechanism 995 for the different units to communicate with each other, with the OS, and with other applications (not shown). For example, media identifying unit 980, media processing unit 985, and service processing unit 990 may implement one or more processes shown in FIGS. 2, 7, and 8. The described units and elements can be varied in design, function, configuration, or implementation and are not limited to the descriptions provided.

In some example embodiments, when information or an execution instruction is received by API unit 945, it may be communicated to one or more other units (e.g., logic unit 960, input unit 970, output unit 975, media identifying unit 980, media processing unit 985, service processing unit 990). For example, after input unit 970 has received or detected a media file (e.g., Segment S), input unit 970 may use API unit 965 to communicate the media file to media processing unit 985. Media processing unit 985 communicates with media identifying unit 980 to identify a starting point and a starting matrix. Media processing unit 985 goes through, for example, process 800 to process Segment S and generate scores for different Big Fs. If a service is identified, service processing unit 990 communicates and manages the service subscription associated with Segment S.

In some examples, logic unit 960 may be configured to control the information flow among the units and direct the services provided by API unit 965, input unit 970, output unit 975, media identifying unit 980, media processing unit 985, service processing unit 990 in order to implement an embodiment described above. For example, the flow of one or more processes or implementations may be controlled by logic unit 960 alone or in conjunction with API unit 965.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A computer-implemented method for processing media data, the method comprising, by a hardware processor of a server system:
   receiving, by the server system, a plurality of media files, wherein each of the plurality of media files comprises first audio data in an auditory range associated with a target user;
   for each one of the plurality of media files, at the hardware processor,
   generating a fingerprint audio track that is unique to the one of the media files and is only within an inaudible frequency band of the first audio data, and is not in the auditory range associated with the target user,
   producing a signed media file by adding the first audio data of the one of the media files to the fingerprint audio track,
   in a database, storing fingerprint data, representing the fingerprint audio track, in association with media information for the signed media file, and
   providing the signed media file for distribution to the target user;
   receiving, by a terminal device, a request comprising requested fingerprint data that is only in the inaudible frequency band and is not in the auditory range associated with the target user, and that is in second audio data that includes content that is in the auditory range associated with the target user;
   identifying a match between a portion of the fingerprint data in the database that represents the fingerprint audio track and a portion of the requested fingerprint data in the second audio data;
   retrieving the media information of the signed media file associated with the match; and
   providing the retrieved media information to the terminal device in response to the request, wherein the request is received in real-time as the second audio data is received at the terminal, and wherein the computer-implemented method further comprises queueing the requested fingerprint data for searching in the order that the requested fingerprint data is received.

2. The computer-implemented method of claim 1, wherein the identifying is optimized based on a media type associated with the requested fingerprint data, wherein the inaudible frequency band is between 10 kHz to 24 kHz, and wherein each fingerprint audio track comprises one or more silence periods.

3. The computer-implemented method of claim 2, wherein the media type is at least one of an audio file in a film score, an audio file in a television show, an audio file in a streaming video or a segment of an advertisement.

4. The computer-implemented method of claim 3, wherein the identifying comprises:
   for each of a plurality of fingerprint data stored in the database, computing a score for the stored fingerprint data based on a comparison of the stored fingerprint data to the requested fingerprint data; and
   identifying at least one the plurality of the fingerprint data, having a score that exceeds a threshold value associated with the media type, as a match to the requested fingerprint data.

5. The computer-implemented method of claim 1, further comprising:
   receiving plural ones of the request; and
   processing each of the plural ones of the request simultaneously.

6. The computer-implemented method of claim 1, wherein the retrieved media information is communicated to an external Internet Protocol (IP) address as a live stream.

7. A non-transitory computer readable medium having stored therein computer executable instructions for, at a server system:
   receiving, by the server system, a plurality of media files, wherein each of the plurality of media files comprises first audio data in an auditory range associated with a target user;
   for each one of the plurality of media files,
   generating a fingerprint audio track that is unique to the one of the media files and is only within an inaudible frequency band of the first audio data, and is not in the auditory range associated with the target user,
   producing a signed media file by adding the first audio data of the one of the media files to the fingerprint audio track,
   in a database, storing fingerprint data, representing the fingerprint audio track, in association with media information for the signed media file, and
   providing the signed media file for distribution to the target user;
   receiving, by a terminal device, a request comprising requested fingerprint data that is only in the inaudible frequency band and is not in the auditory range associated with the target user, and that is in second audio data that includes content that is in the auditory range associated with the target user;
   identifying a match between a portion of the fingerprint data in the database that represents the fingerprint audio track and a portion of the requested fingerprint data in the second audio data;
   retrieving the media information of the signed media file associated with the match; and
   providing the retrieved media information to the terminal device in response to the request,
   wherein the request is received in real-time as the second audio data is received at the terminal, and wherein the instructions further comprise queueing the requested fingerprint data for searching in the order that the requested fingerprint data is received.

8. The non-transitory computer readable medium of claim 7, wherein the identifying is optimized based on a media type associated with the requested fingerprint data, wherein the inaudible frequency band is between 10 kHz to 24 kHz, and wherein each fingerprint audio track comprises one or more silence periods.

9. The non-transitory computer readable medium of claim 8, wherein the media type is at least one of an audio file in a film score, an audio file in a television show, an audio file in a streaming video, or a segment of an advertisement.

10. The non-transitory computer readable medium of claim 9, wherein the identifying comprises:
for each of a plurality of fingerprint data stored in the database, computing a score for the stored fingerprint data based on a comparison of the stored fingerprint data to the requested fingerprint data; and
identifying at least one the plurality of the fingerprint data, having a score that exceeds a threshold value associated with the media type, as a match to the requested fingerprint data.

11. The non-transitory computer readable medium of claim 7, wherein the computer executable instructions further:
receive plural ones of the request; and
process each of the plural ones of the request simultaneously.

12. The non-transitory computer readable medium of claim 7, wherein the retrieved media information is communicated to an external Internet Protocol (IP) address as a live stream.

13. A system for processing media data, the system comprising:
a database;
a hardware processor; and
computer-executable instructions that, when executed by the at least one hardware processor,
receive a plurality of media files, wherein each of the plurality of media files comprises first audio data in an auditory range associated with a target user,
for each of the plurality of media files, at the hardware processor,
generate a fingerprint audio track that is unique to one of the media files and is only within an audible frequency band of the first audio data, and is not in the auditory range associated with the target user,
produce a signed media file by adding the first audio data of the one of the media files to the fingerprint audio track,
in the database, store fingerprint data, representing the fingerprint audio track, in association with media information for the signed media file, and
provide the signed media file for distribution to the target user;
receive a request comprising requested fingerprint data that is only in the inaudible frequency band and is not in the auditory range associated with the target user, and that is in second audio data that includes content that is in the auditory range associated with the target user,
identify a match between a portion of the fingerprint data in the database that represents the fingerprint audio track and a portion of the requested fingerprint data in the second audio data,
retrieve the media information of the signed media file associated with the match, and
provide the retrieved media information to the terminal device in response to the request,
wherein the request is received in real-time as the second audio data is received at the terminal, and wherein the computer-executable instructions further comprise queueing the requested fingerprint data for searching in the order that the requested fingerprint data is received.

14. The system of claim 13, further comprising a master node which communicates with a plurality of servers over a local area network and receives a plurality of identification requests from external sources over the Internet, wherein the master node distributes the identify instruction for each of the plurality of identification requests to one of the plurality of servers based on a type of media data from which the fingerprint data in the identification request was generated, wherein the inaudible frequency band is between 10 kHz to 24 kHz, and wherein each fingerprint audio track comprises one or more silence periods.

15. The system of claim 14, wherein each server of the plurality of servers is configured to simultaneously perform searching for multiple identification requests that comprise fingerprint data generated from a different type of media data.

16. The system of claim 14, wherein each of the plurality of servers returns results of each search to the master node, and wherein the master node communicates the retrieved media information for each search to a corresponding external source via the Internet.

17. The system of claim 13, wherein identifying comprises:
for each of a plurality of fingerprint data stored in the database, computing a score for the stored fingerprint data based on a comparison of the stored fingerprint data to the requested fingerprint data; and
identifying at least one the plurality of the fingerprint data, have a score that exceeds a threshold associated with a media type associated with the requested fingerprint data, as a match to the requested fingerprint data.

18. The computer-implemented method of claim 1, wherein generating the fingerprint audio track that is unique to the media file comprises generating a pattern of musical notes in the inaudible frequency band that is identical or similar to a pattern of musical notes in an audible frequency band of the first audio data of the media file.

19. The computer-implemented method of claim 1, wherein the second audio data comprises an advertisement for a product or a service, and for the match resulting in plural ones of the fingerprint audio track for the requested fingerprint associated with the advertisement, providing an ordered list of the product or the service associated with the plural ones of the fingerprint audio track.

* * * * *